US012420189B2

(12) United States Patent
Rao et al.

(10) Patent No.: US 12,420,189 B2
(45) Date of Patent: Sep. 23, 2025

(54) SYSTEMS AND METHODS FOR INTEGRATING REAL-WORLD CONTENT IN A GAME

(71) Applicant: Sony Interactive Entertainment Inc., Tokyo (JP)

(72) Inventors: Sharath Rao, Santa Clara, CA (US); Lakshmish Kaushik, San Jose, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 297 days.

(21) Appl. No.: 17/960,487

(22) Filed: Oct. 5, 2022

(65) Prior Publication Data

US 2024/0115947 A1 Apr. 11, 2024

(51) Int. Cl.
*A63F 13/537* (2014.01)
*A63F 13/65* (2014.01)

(52) U.S. Cl.
CPC .......... *A63F 13/537* (2014.09); *A63F 13/65* (2014.09)

(58) Field of Classification Search
CPC .................. A63F 13/537; A63F 13/65; A63F 2300/8082; A63F 13/655; A63F 13/63
See application file for complete search history.

(56) References Cited

U.S. PATENT DOCUMENTS

| 10,725,308 | B1* | 7/2020 | Trail | G06F 3/012 |
| 10,916,057 | B2* | 2/2021 | Leppanen | G06F 3/012 |
| 2008/0310707 | A1* | 12/2008 | Kansal | G06T 19/006 382/154 |
| 2009/0066690 | A1* | 3/2009 | Harrison | G06T 19/006 345/419 |
| 2009/0150802 | A1* | 6/2009 | Do | G06F 3/011 715/757 |
| 2009/0271436 | A1* | 10/2009 | Reisinger | G06F 30/20 |
| 2010/0005007 | A1* | 1/2010 | Cox | G06Q 30/06 705/26.1 |
| 2010/0100851 | A1* | 4/2010 | Clark | G06T 19/00 715/849 |
| 2010/0125799 | A1* | 5/2010 | Roberts | G06F 3/011 715/757 |
| 2011/0300917 | A1* | 12/2011 | Hill | G07F 17/32 463/11 |
| 2013/0065692 | A1* | 3/2013 | Aronzon | A63F 13/216 463/43 |

(Continued)

OTHER PUBLICATIONS

PCT/US2023/075725, Notification of Transmittal of the International Search Report and the Written Opinion of the International Searching Authority, or the Declaration, PCT/ISA/220, and the International Search Report, PCT/ISA/210, Feb. 5, 2024.

*Primary Examiner* — Steve Rowland
(74) *Attorney, Agent, or Firm* — Kilpatrick Townsend & Stockton LLP

(57) ABSTRACT

A method for integration of real-world content into a game is described. The method includes receiving a request to play the game and accessing overlay multimodal data generated from a portion of real-world multimodal data received as user generated content (RGC). The overlay multimodal data relates to authored multimodal data generated for the game. The method includes replacing the authored multimodal data in one or more scenes of the game with the overlay multimodal data.

18 Claims, 9 Drawing Sheets

(56) References Cited

U.S. PATENT DOCUMENTS

| | | |
|---|---|---|
| 2013/0117377 A1 | 5/2013 | Miller |
| 2015/0032823 A1 | 1/2015 | Miller |
| 2016/0100034 A1 | 4/2016 | Miller |
| 2016/0189426 A1* | 6/2016 | Thomas ............. G02B 27/0172 345/633 |
| 2016/0359930 A1 | 12/2016 | Miller |
| 2017/0291107 A1* | 10/2017 | Lee ........................ A63F 13/213 |
| 2018/0004286 A1* | 1/2018 | Chen ..................... G06F 3/0481 |
| 2018/0173404 A1* | 6/2018 | Smith ..................... G06F 3/017 |
| 2018/0205773 A1 | 7/2018 | Miller |
| 2018/0350146 A1* | 12/2018 | Gervasio ............... G06T 19/006 |
| 2019/0020843 A1* | 1/2019 | Reif ....................... G06F 3/0304 |
| 2019/0035124 A1* | 1/2019 | Kapinos .................. G06T 11/60 |
| 2019/0158549 A1 | 5/2019 | Miller |
| 2020/0053137 A1 | 2/2020 | Miller |
| 2021/0049361 A1* | 2/2021 | Drake ................... G06F 16/587 |
| 2021/0228988 A1* | 7/2021 | Franceus ............. A61B 5/0022 |
| 2021/0272328 A1* | 9/2021 | Navab .................. G02B 27/017 |
| 2021/0379492 A1* | 12/2021 | Baughman ............ A63F 13/213 |
| 2021/0383115 A1* | 12/2021 | Alon ...................... B25J 9/1602 |
| 2022/0062763 A1* | 3/2022 | Wong ....................... A63F 13/35 |
| 2022/0101002 A1* | 3/2022 | Whitman ............... G06V 20/20 |
| 2023/0277942 A1* | 9/2023 | Guzik .................... A63F 13/67 463/42 |

* cited by examiner

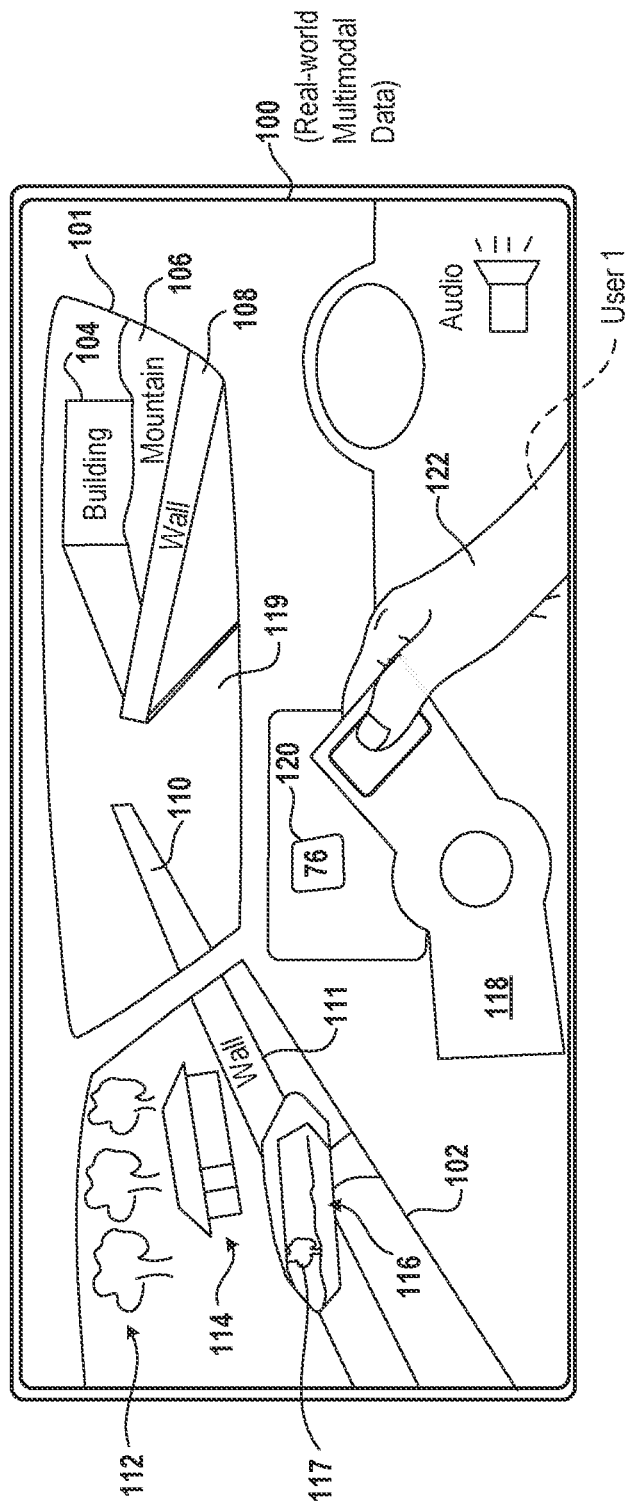
FIG. 1 (Real-World Multimodal Data During A Race)

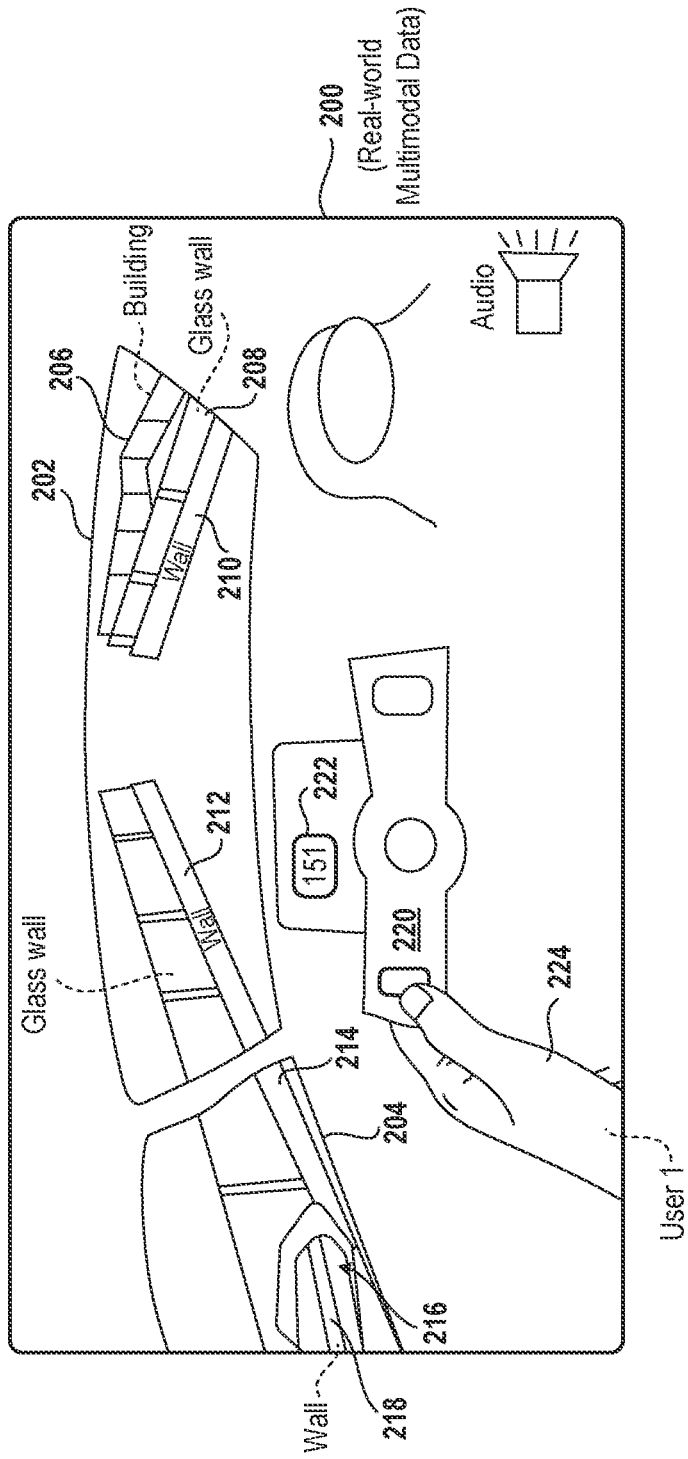
FIG. 2 (Real-World Multi-modal Data During the Race)

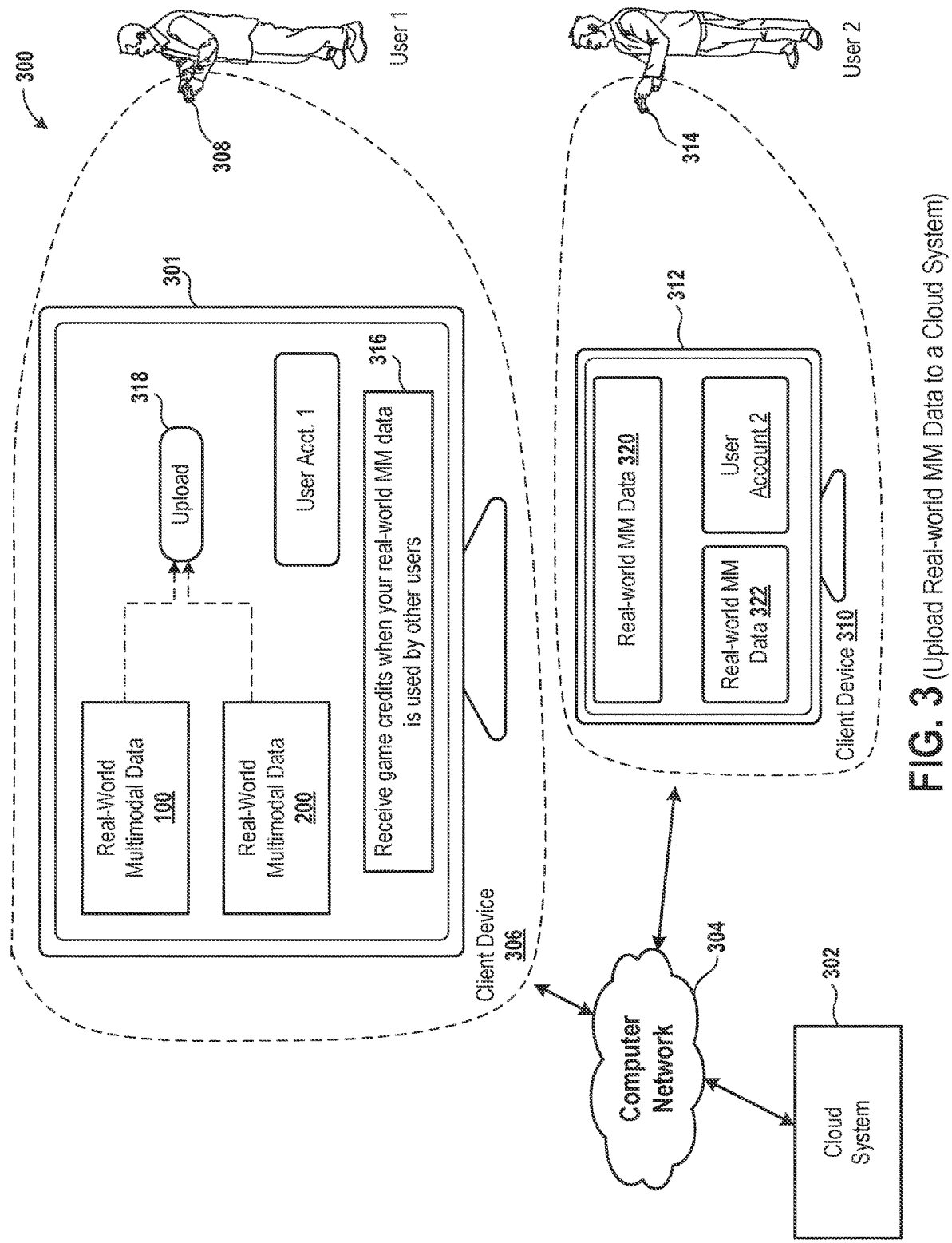
FIG. 3 (Upload Real-world MM Data to a Cloud System)

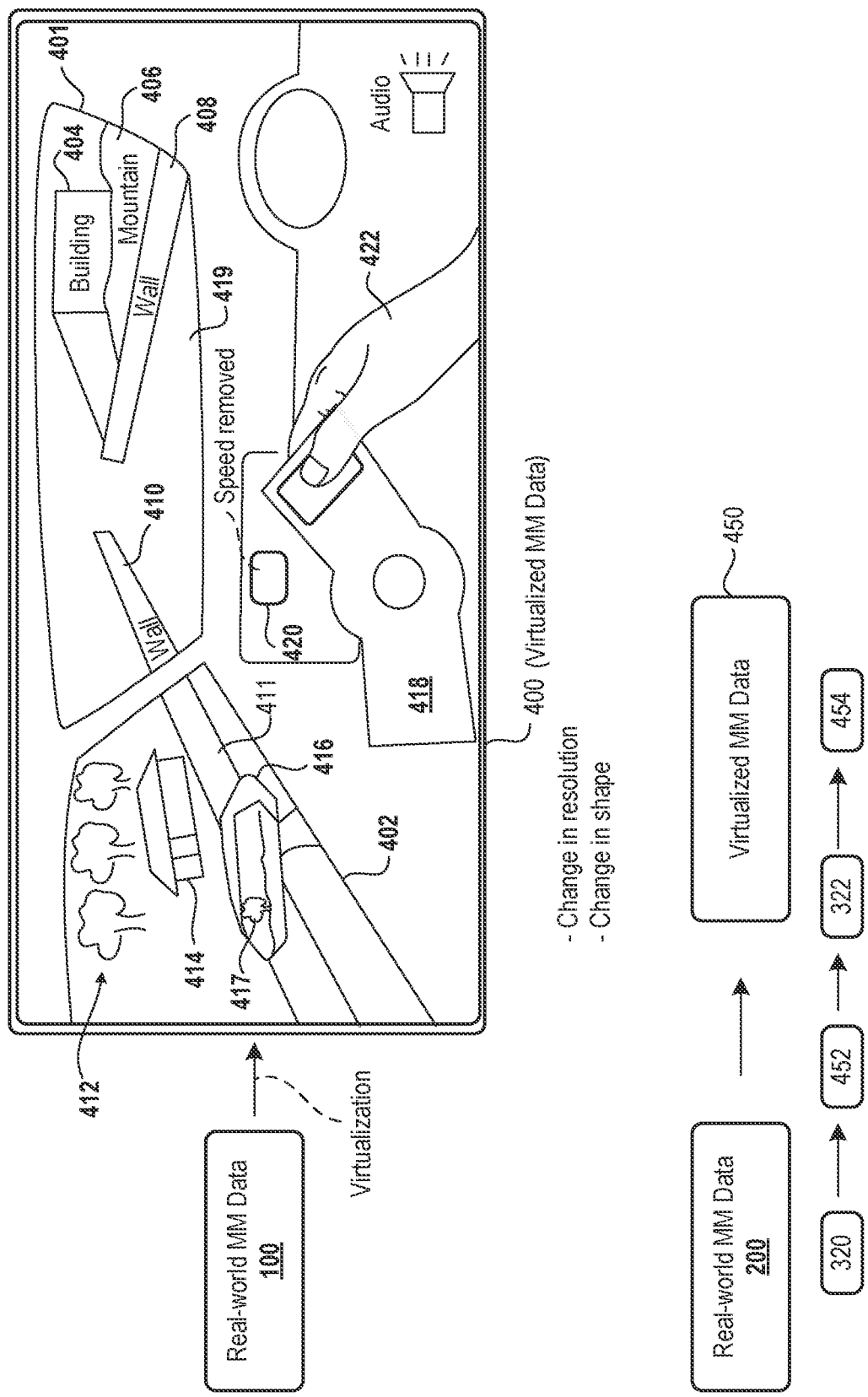
FIG. 4 (virtualization)

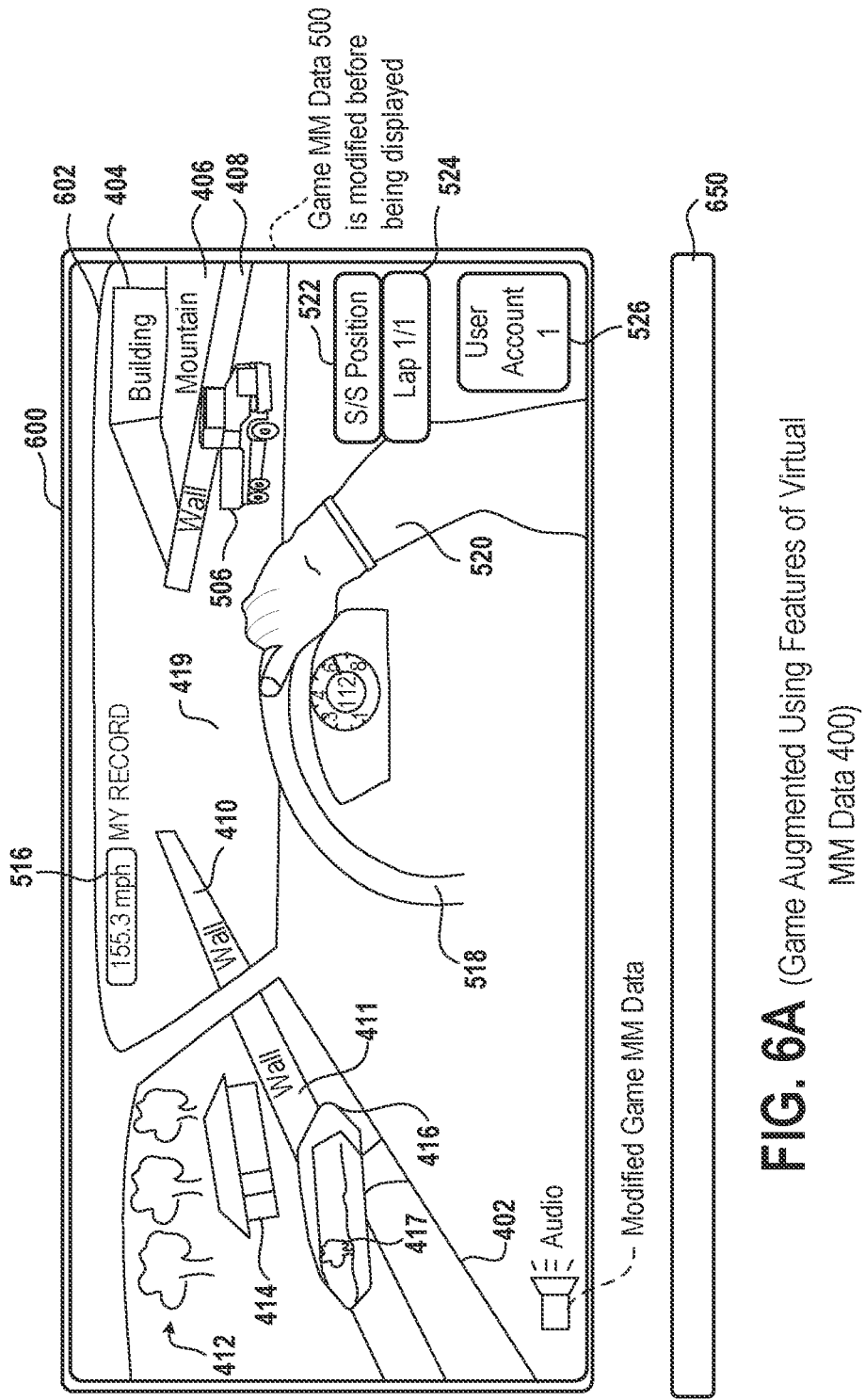
FIG. 6A (Game Augmented Using Features of Virtual MM Data 400)

SYSTEMS AND METHODS FOR INTEGRATING REAL-WORLD CONTENT IN A GAME

FIELD

The present disclosure relates to systems and methods for integrating real-world content into a game are described.

BACKGROUND

A variety of video games are accessible to multiple players via a server. For example, hundreds of thousands of players access games known as massive multi player online games (MMOGs). Players of these games customarily access a game repeatedly, for durations typically ranging from a few minutes to several days, over a given period of time, which may be days, weeks, months or even years. The games are often constructed such that players pay a periodic subscription price rather than, or in addition to, paying a one-time purchase price for the game. Often, though not necessarily, these games have no ultimate "winner" or "winning goal," but instead attempt to create an enjoyable playing environment and a strong player community. There are a lot of efforts and a lot of resources spent in developing the video games.

It is in this context that embodiments of the invention arise.

SUMMARY

Embodiments of the present disclosure provide systems and methods for integrating real-world content into a game.

In an embodiment, a cloud system has an enormous capability to transform user data to include in a video game. For example, the cloud system has the capability to integrate real-world multimodal (MM) data into video games, such as a Grand Turismo (GT™) car racing game, a bicycle racing game, a motor bike racing game, a reality exercise game, and many other video games, which are developed based on real-world events. As an example, multimodal data includes image, or video, or three-dimensional (3D) video format, or audio, or a combination of two or more thereof. In the embodiment, a user operates a camera to record multimodal data of a real-world race track while driving his/her real-world race car, and uploads the multimodal data to his/her user account. The cloud system then virtualizes the multimodal data of the real-world race track to output multimodal data of a virtualized race track and integrates the multimodal data of the virtualized race track into game multimodal data of the GT™ car racing game. Dynamics of a real-world scenario having real-world traffic and the real-world race track of the real-world race provides a unique experience to the user while playing the video game. By integrating the real-world scenario into the video game, a gaming experience of the user is enriched.

Also, sharing of user generated content, such as the multimodal data of the real-world race track, is promoted. For example, the user is encouraged to share the multimodal data of the real-world race track by awarding game credits to the user.

In one embodiment, a method for integration of real-world content into a game is described. The method includes receiving a request to play the game and accessing overlay multimodal data generated from a portion of real-world multimodal data received as user generated content (RGC). The overlay multimodal data relates to authored multimodal data generated for the game. The method includes replacing the authored multimodal data in one or more scenes of the game with the overlay multimodal data.

In an embodiment, machine learning approaches, computer vision techniques, or reinforcement learning approaches are implemented to "gamify" real-world multimodal data. For example, machine learning is used to obtain features from virtualized multimodal data and compared the features with features from game multimodal data. Based on similarity between the features of the virtualized multimodal data and the game multimodal data, an artificial intelligence (AI) model is trained. After the AI model is trained, the AI model can determine a probability that a feature of another virtualized multimodal data is similar to a feature of the game multimodal data. Based on the probability, the feature of the game multimodal data is augmented with the feature of the other virtualized multimodal data.

In an embodiment, a server for integration of real-world content into a game is described. The server includes a memory device and a processor coupled to the memory device. The processor receives a request to play the game and accesses, from the memory device, overlay multimodal data generated from a portion of real-world multimodal data received as user generated content. The overlay multimodal data relates to authored multimodal data generated for the game. The processor replaces the authored multimodal data in one or more scenes of the game with the overlay multimodal data.

In one embodiment, a non-transitory computer-readable medium containing program instructions for integration of real-world content into a game is described. Execution of the program instructions by one or more processors of a computer system causes the one or more processors to carry out operations of receiving a request to play the game and accessing overlay multimodal data generated from a portion of real-world multimodal data received as user generated content. The overlay multimodal data relates to authored multimodal data generated for the game. The operations include replacing the authored multimodal data in one or more scenes of the game with the overlay multimodal data.

Some advantages of the herein described systems and methods include reducing limitations of authors in developing the video game. Examples of the video game include a dirt bike racing game and a bicycle racing game. Users use cameras to capture and provide multimodal data of real-world scenarios to the cloud system while participating in a real-world race, such as a dirt bike race or a bicycle race. The multimodal data of the real-world scenarios is virtualized and then placed in the video game. This reduces efforts of the authors in developing the video game.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1 is a diagram of an embodiment of real-world multimodal (MM) data captured during a Grant Turismo (GT™) car race.

FIG. 2 is a diagram of an embodiment of another real-world multimodal data captured during the GT™ car race.

FIG. 3 is a diagram of an embodiment of a system including a display device to illustrate a method for uploading real-world multimodal data to a cloud system.

FIG. 4 is an embodiment of virtualized real-world multimodal data and an embodiment of another virtualized real-world multimodal data to illustrate a method of virtualization of the real-world multimodal data.

FIG. 6A is a diagram of an embodiment of modified game multimodal data to illustrate a method for modifying the game multimodal data of FIG. 5 using virtualized real-world multimodal data.

FIG. 6B-1 is a diagram of an embodiment of modified game multimodal data to illustrate that an MM data portion of modified game multimodal data is authored and another MM data portion of the modified game multimodal data includes one or more overlays.

FIG. 6B-2 is a diagram of an embodiment of game multimodal data to illustrate that an MM data portion of game multimodal data is authored and another MM data portion of the game multimodal data is also authored.

FIG. 6B-3 is a diagram of an embodiment of modified game multimodal data to illustrate that an MM data portion of modified game multimodal data includes one or more overlays and another MM data portion of the modified game multimodal data includes one or more overlays.

DETAILED DESCRIPTION

Systems and methods for integrating real-world content into a game are described. It should be noted that various embodiments of the present disclosure are practiced without some or all of these specific details. In other instances, well known process operations have not been described in detail in order not to unnecessarily obscure various embodiments of the present disclosure.

Figures 1, 6B:
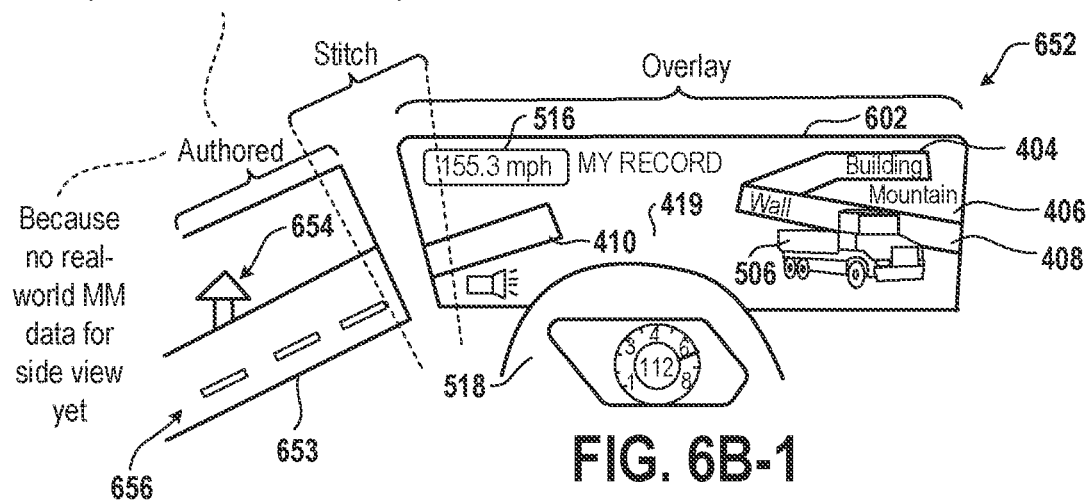

FIG. 1 is a diagram of an embodiment of real-world multimodal (MM) data 100 captured during a Grand Turismo (GT™) car race. As an example, multimodal data, as used herein, includes image, or video, or three-dimensional (3D) video format, or audio, or a combination of two or more thereof. The real-world multimodal data 100 includes an MM data portion 101 representing a view from a front windshield of a GT™ race car towards a race track, and an MM data portion 102 representing a view, looking outside, from a front side window of the GT™ race car. Real-world multimodal data or real-world multimodal data portion is sometimes referred to herein as user generated content (RGC). The real-world multimodal data 100 is captured using one or more digital cameras that are attached to the GT™ race car. For example, a digital camera is attached within a driver compartment of the GT™ race car and faces towards the front windshield and the front side window to capture the real-world multimodal data 100. As another example, a first digital camera is attached to the GT™ race car to capture images of a view from the front side window of the GT™ race car and a second digital camera is attached to the GT™ race car to capture images of a view from the front windshield of the GT™ race car.

The MM data portion 101 includes an MM data portion 104 representing a real-world building, an MM data portion 106 representing a real-world mountain, an MM data portion 108 representing a real-world right wall, an MM data portion 110 representing a real-world left wall, and an MM data portion 419 representing a real-world race track between the real-world right wall and the real-world left wall. Moreover, the MM data portion 102 includes an MM data portion 112 representing multiple real-world trees, and MM data portion 114 representing a real-world house, an MM data portion 111 representing the real-world left wall, and an MM data portion 116 representing a real-world left side rearview mirror of the GT™ race car. Within the MM data portion 116 of the real-world left side rearview mirror, an MM data portion 117 representing a real-world tree is located.

Also, the real-world multimodal data 100 includes images of components, such as an MM data portion 118 representing a real-world steering wheel and an MM data portion 120 representing a real-world speedometer, inside the GT™ race car, and an MM data portion 122 representing a right glove worn on a right hand of a user 1. The user 1 is a driver of the GT™ race car. It should be noted that examples of real-world objects include the real-world building, the real-world mountain, the real-world right wall, the real-world left wall, real-world race track, the real-world left side rearview mirror, real-world tree, the real-world steering wheel, the real-world speedometer, and GT™ race car.

Figures 2, 6B:
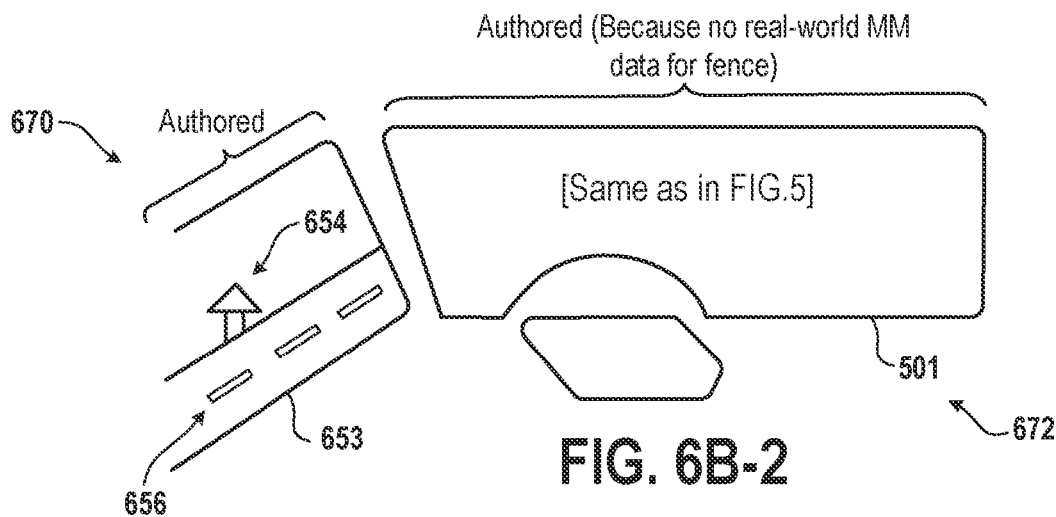

FIG. 2 is a diagram of an embodiment of another real-world multimodal data 200 captured during the GT™ car race. The real-world multimodal data 200 is captured by the one or more digital cameras after the real-world multimodal data 100 (FIG. 1) is captured. For example, the real-world multimodal data 200 is captured a few seconds, such as 2, or 5 seconds, later after the real-world multimodal data 100 is captured.

The real-world multimodal data 200 includes an MM data portion 202 representing a view from the front windshield of the GT™ race car looking outside the GT™ race car towards the race track, and another MM data portion 204 representing a view, looking outwards, from the front side window of the GT™ race car. The real-world multimodal data 200 is captured using the one or more digital cameras that are attached to the GT™ race car. For example, the digital camera attached inside the driver compartment of the GT™ race car captures the real-world multimodal data 200.

The MM data portion 202 includes an MM data portion 206 representing a real-world building, an MM data portion 208 representing a real-world glass wall, an MM data portion 210 representing the real-world right wall, and an MM data portion 212 representing the real-world left wall. Moreover, the image 204 includes an MM data portion 214 representing the real-world left wall, and an MM data portion 216 representing the real-world left side rearview mirror of the GT™ race car. Within the MM data portion 216 representing the real-world left side rearview mirror, an MM data portion 218 representing the real-world left wall is located.

Also, the image 200 includes a view of the components, such as an MM data portion 220 representing the real-world steering wheel, an MM data portion 222 representing the real-world speedometer 118, and an MM data portion 224 representing a left glove worn on a left hand of the user 1.

Figures 3, 6B:
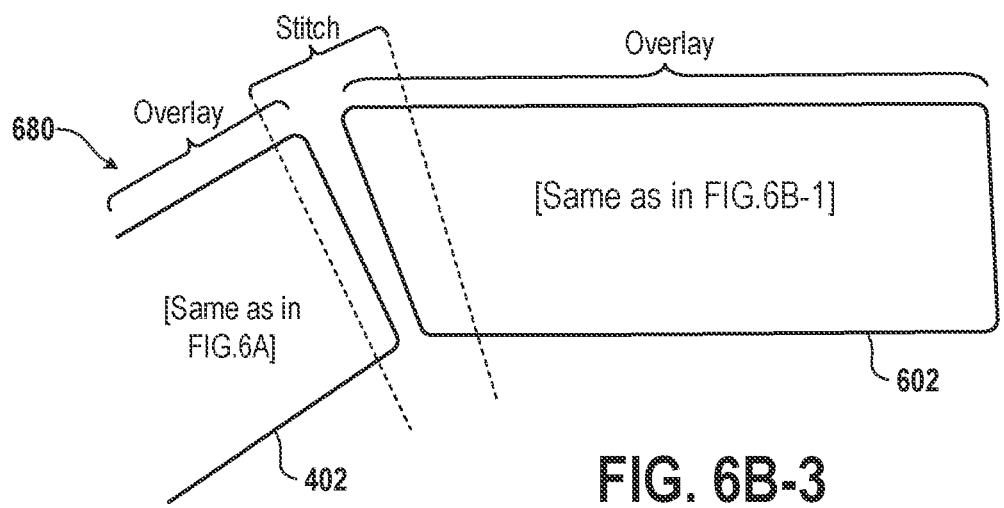

FIG. 3 is a diagram of an embodiment of a system 300 including a display device 301 to illustrate a method for uploading data of the real-world multimodal data 100 and 200 to a cloud system 302. Examples of a display device includes a liquid crystal display (LCD) device, a light emitting diode (LED) display device, and a plasma display device. An example of the cloud system 302 is one or more servers that are coupled to each other directly, without using a computer network 304, or via the computer network 304. An example of the computer network 304 includes a wide area network (WAN) or a local area network (LAN) or a combination thereof. To illustrate, the computer network 304 is the Internet, or an Intranet, or a combination thereof.

The system 300 includes a client device 306, which includes the display device 301 and a hand-held controller 308. Also, the system 300 includes another client deice 310, which includes a display device 312 and a hand-held controller 314, which is operated by a user 2. Examples of a client device, as used herein, include a mobile phone, a desktop computer, a smart television, and a laptop computer. Also, an example of a client device includes a combination of a display device, a hand-held controller, and a game console. Moreover, an example of a client device includes a combination of a display device and a hand-held controller. An example of a hand-held controller is a game pad or a joypad or a game controller or a mobile phone.

The user 1 logs into his/her user account 1. As an example, the user account 1 is accessed to access multiple video games from the cloud system 302 via the computer network 304. After logging into the user account 1, the user 1 uses an input device to upload data of the real-world multimodal data 100 and 200 to the user account 1 stored within the cloud system 302. For example, the user 1 uses the input device to select an image of an upload button 318 displayed on the display device 301. In response to receiving an indication of the selection, a processor of the client device 306 sends the data of the real-world multimodal data 100 and 200 via the computer network 304 to the cloud system 302. Upon receiving the data of the real-world multimodal data 100 and 200, the data of the real-world multimodal data 100 and 200 is stored by one or more processors of the cloud system 302 in one or more memory devices of the cloud system 302. The one or more processors of the cloud system 302 are coupled to the one or more memory devices of the cloud system 302. Also, the one or more processors of the cloud system 302 and the one or more memory devices of the cloud system 302 are components of the one or more servers of the cloud system 302.

Moreover, the display device 301 includes a notification 316, generated by the one or processors of the cloud system 302, to indicate to the user 1 via the user account 1 that when one or more real-world objects represented within the real-world multimodal data 100 and 200 are used by other users, such as the user 2, the one or more processors will generate game credits to award to the user 1 via the user account 1. Examples of an input device, as used herein, include the hand-held controller 306, a mouse, a keyboard, a keypad, and a touchscreen, and a combination of two or more thereof.

An example of a processor, as used herein, is a central processing unit (CPU), or an application specific integrated circuit (ASIC), or a programmable logic device (PLD), or a microcontroller. Also, an example of a memory device, as used herein, is a read-only memory (ROM) or a random access memory (RAM) or a combination thereof.

The user 2 logs into a user account 2, assigned to the user 2, to upload real-world multimodal data 320 and 322 to the cloud system 302 or to access a video game, such as the GT™ car racing game. The user 2 uses an upload button displayed on the display device 312 to upload the real-world multimodal data 320 and 322 to the cloud system 302 via the computer network 304. As an example, the real-world multimodal data 320 and 322 are captured by one or more cameras that are attached to a motor bike that is driven by the user 2. Once the video game is accessed via the user account 2, game multimodal data regarding the video game are displayed on the display device 312.

In an embodiment, instead of one or more of the display devices 301 and 312, one or more head-mounted display devices (HMDs) are used.

FIG. 4 is an embodiment of virtualized real-world multimodal data 400 and an embodiment of virtualized real-world multimodal data 450 to illustrate a method of virtualization of the real-world multimodal data 100 and 200. Data of the real-world multimodal data 100 and 200 is virtualized to output data of the virtualized real-world multimodal data 400 and 450, respectively. For example, the data of the virtualized real-world multimodal data 400 is generated by the one or more processors of the cloud system 302 from the data of the real-world multimodal data 100 and the data of the virtualized real-world multimodal data 450 is generated by the one or more processors of the cloud system 302 from the data of the real-world multimodal data 200.

The virtualized real-world multimodal data 400 includes an MM data portion 401 generated by the one or more processors of the cloud system 302 from the MM data portion 101 (FIG. 1), and includes an MM data portion 402 generated by the one or more processors of the cloud system 302 from the MM data portion 102 (FIG. 1). The MM data portion 401 includes an MM data portion 404 representing the real-world building, an MM data portion 406 representing the real-world mountain, an MM data portion 408 representing the real-world right wall, an MM data portion 410 representing the real-world left wall, and an MM data portion 419 representing the real-world race track.

Moreover, the MM data portion 402 includes an MM data portion 412 representing the real-world trees, an MM data portion 414 representing the real-world house, an MM data portion 411 representing the real-world left wall, and an MM data portion 416 representing the real-world left side rearview mirror of the GT™ race car. Within the MM data portion 416 representing the real-world left side rearview mirror, an MM data portion 417 representing the real-world tree is located.

Also, the virtualized real-world multimodal data 400 includes images of components, such as an MM data portion 418 representing the real-world steering wheel and an MM data portion 420 representing the real-world speedometer, and an MM data portion 422 representing the right glove worn on the right hand of the user 1.

The one or more processors of the cloud system 302 modify one or more graphical parameters of one or more of the MM data portions of the real-world multimodal data 100 to generate one or more of the MM data portions of the virtualized real-world multimodal data 400. For example, the one or more processors of the cloud system 302 modify, such as increase or decrease, a resolution of the MM data portion 104 representing the real-world building to output the MM data portion 404. Examples of the graphical parameters of an MM data portion include size, shape, resolution, intensity, color, shade, and texture of the MM data portion.

Moreover, the one or more processors of the cloud system 302 maintain a correspondence between a first set including a first reference coordinate of the real-world multimodal data 100 and an MM data portion of the real-world multimodal data 100 and a second set including a second reference coordinate of the virtualized real-world multimodal data 400 and an MM data portion of the virtualized real-world multimodal data 400. For example, a first distance between the top right corner of the virtualized real-world multimodal data 400 and the MM data portion 408 is scaled, such as increased or decreased, with respect to a second distance between a top right corner of the real-world multimodal data 100 and the MM data portion 108 (FIG. 1). In the example, the top right corner of the virtualized real-world multimodal data 400 is an example of the second reference coordinate and the top right corner of the real-world multimodal data 100 is an example of the first reference coordinate. Moreover, in the example, the first distance is scaled to match a ratio between a size of the virtualized real-world multimodal data 400 and a size of the real-world multimodal data 100.

In addition, the one or more processors of the cloud system 302 modify one or more of the MM data portions of the real-world multimodal data 100 to remove the one or more of the MM data portions to output the virtualized real-world multimodal data 400. For example, the one or more processors of the cloud system 302 remove, such as delete, a representation of speed of the GT™ race car from the MM data portion 120 (FIG. 1) to generate the MM data portion 420. In the example, the one or more processors of the cloud system 302 do not add an MM data portion representing one or more virtual objects, such as a virtual tree or virtual shrubs, within the virtualized real-world multimodal data 400.

Also, no MM data portion of virtualized real-world multimodal data is authored. For example, none of MM data portions of the virtualized real-world multimodal data 400 is developed, such as created, by a game developer. To illustrate, the game developer does not use an input device to code the graphical parameters of the MM data portion 408 or 419.

It should further be noted that virtualized real-world multimodal data, described herein, such as the virtualized real-world multimodal data 400, 450, 452, and 454, is not generated by execution of a game code, such as a game program, of the video game. For example, the virtualized real-world multimodal data 400 and 450 is not generated by the one or more processors of the cloud system 302 based on one or more game states of the video game, such as the GT™ racing car game. Examples of the game states include one or more positions, one or more orientations, or a combination thereof of one or more virtual objects of the video game.

It should be further noted that one or more MM data portions of the real-world multimodal data 100 are augmented, such as covered, to generate the virtualized real-world multimodal data 400 maintain privacy of the user 1 or of other real-world objects or of the other users. For example, the one or more processors of the cloud system 302 obfuscates, such as covers or blocks or blurs or overlays with an opaque object, one or more MM data portions of the real-world multimodal data 100 to protect personal information, such as look or facial features, of the other users. As another example, the one or more processors of the cloud system 302 obfuscates one or more MM data portions of the real-world multimodal data 100 to blur a number plate of a car, which is not participating in the GT™ car race. In a similar manner, the virtualized real-world multimodal data 450 is generated by the one or more processors of the cloud system 302 from the real-world multimodal data 200. In a similar manner, the one or more processors of the cloud system 302 generate a virtualized real-world multimodal data 452 from the real-world multimodal data 320 (FIG. 3) and a virtualized real-world multimodal data 454 from the real-world multimodal data 322 (FIG. 3).

The one or more processors of the cloud system 302 assign a virtualized image identifier to each of the virtualized real-world multimodal data, described herein, such as the virtualized real-world multimodal data 400, 450, 452, and 454, to distinguish the virtualized real-world multimodal data from game multimodal data, described below. For example, the one or more processors of the cloud system 302 assign a series of alphanumeric characters, such as VRWI, to the virtualized real-world multimodal data 400, 450, 452, and 454 to differentiate the virtualized real-world multimodal data 400, 450, 452, and 454 from the game multimodal data.

Figure 5:
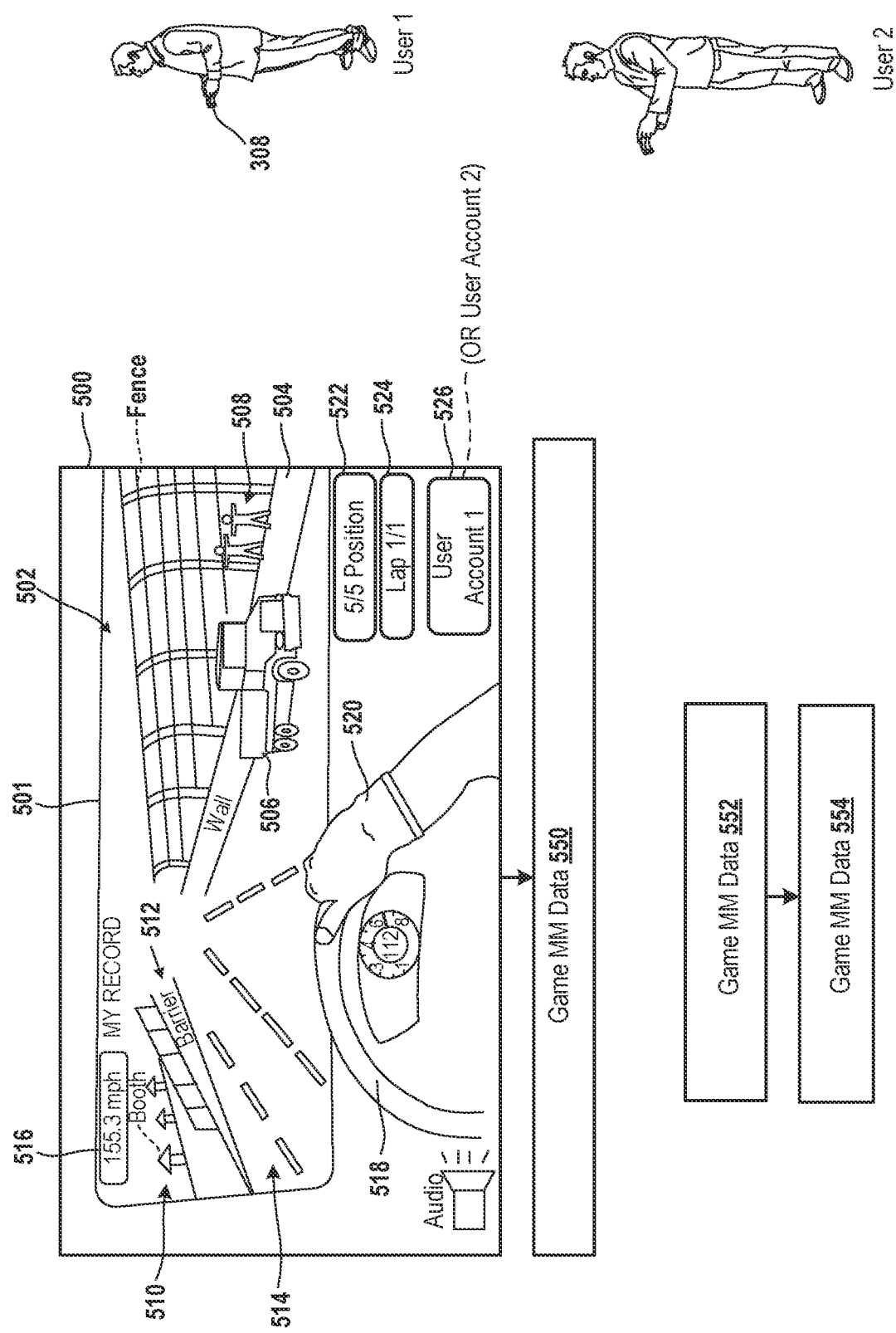
FIG. 5 is a diagram of an embodiment to illustrate game multimodal data and another game multimodal data during a play of a video game by a user via a user account.

FIG. 5 is a diagram of an embodiment to illustrate game multimodal data 500 and game multimodal data 550 during a play of the video game by the user 1 via the user account 1. Once the user 1 logs into the user account 1, the user 1 selects one or more buttons on the hand-held controller 308, and the hand-held controller 308 generates a request to play the video game. For example, the user 1 logs into the user account 1 to access a game session and sends the request to access the video game after accessing the game session. In the example, the user 1 logs out of the user account 1 to end the game session. Further, in the example, the user 1 selects one or more buttons of the hand-held controller 308 to generate another request to play the video game after logging out of the user account 1.

The request is sent from the client device 306 (FIG. 3) via the computer network 304 to the cloud system 302. The cloud system 302 receives the request and provides access to the video game to the client device 306 via the computer network 302. The user 1 then selects one or more buttons on the hand-held controller 308 to play the video game. When the one or more buttons are selected, one or more input signals are generated by the hand-held controller 308 and sent via the computer network 304 to the cloud system 302 for processing by the cloud system 304.

During the play of the game, the one or more processors of the cloud system 302 generate the game multimodal data 500 and 550 based on the one or more game states. The one or more game states are determined by the one or more processors of the cloud system 302 based on one or more input signals indicating the one or more selections on the hand-held controller 308. For example, when one or more selections of one or more buttons on the input device are made by the user 1, one or more input signals are generated by the input device. In the example, the one or more input signals are sent from the client device 306 via the computer network 304 to the one or more processors of the cloud system 302. Further, in the example, the one or more processors of the cloud system 302 determine the one or more game states based on the one or more input signals, generate multiple image frames based on the one or more games states, and encode the image frames to output encoded image frames. In the example, the one or more processors of the cloud system 302 send the encoded image frames via the computer network 304 to the client device 306. In the example, upon receiving the encoded image frames, a decoder of the client device 306 decodes the encoded image frames to output image frames. Further, in the example, the processor of the client device 306 displays the image frames output from the decoder to a display screen of the display device 301 (FIG. 3) as game multimodal data, such as the game multimodal data 500 and 550.

The game multimodal data 500 includes an MM data portion 501 representing a virtual view from a virtual front windshield of a virtual GT™ race car. The MM data portion 501 includes an MM data portion 502 representing a virtual fence, an MM data portion 504 representing a virtual wall, an MM data portion 506 representing another virtual GT™ race car, an MM data portion 508 representing multiple virtual users, an image or portion 510 representing multiple virtual booths, an MM data portion 512 representing a virtual traffic barrier, and an MM data portion 514 representing multiple virtual lane dividers on a virtual road in front of the virtual GT™ race car. Also, the MM data portion 501 includes an MM data portion 516 representing a virtual speed record achieved by the user 1 via the user account 1 during multiple game sessions of the video game.

Also, the image 500 includes an MM data portion 518 representing a virtual steering wheel of the virtual GT™ race car, an MM data portion 520 representing a virtual right hand of a virtual user that is driving the virtual GT™ race car, an MM data portion 522 indicating a position of the virtual user in the virtual GT™ race car among positions of multiple virtual users in the virtual GT™ race car, an MM data portion 524 indicating a lap that is travelled by the virtual GT™ race car, and an MM data portion 526 indicating the user account 1. The user 1 controls movement of the virtual right hand of the virtual user via the hand-held controller 308.

The user 2, accesses the user account 2 assigned to the user 2 by the one or more processors of the cloud system 302 to access the video game. When the video game is accessed via the user account 2, games images 552 and 554 are displayed on the display device 312 (FIG. 3) that is operated by the user 2. Examples of the game multimodal data 552 and 554 include virtual scenes of a motor bike racing video game.

The game multimodal data 500, 550, 552, and 554 is authored data. As used herein, game multimodal data of the video game is generated based on the graphical parameters received from an author, such as a creator, of graphics of the video game. The graphical parameters are provided to the one or more processors of the cloud system 302 by the author via an input device that is coupled to the one or more processors of the cloud system 302.

The one or more processors of the cloud system 302 assign a game multimodal data identifier to each of the game multimodal data 500 and 550 to distinguish the game multimodal data 500 and 550 from the virtualized real-world multimodal data 400 and 450 (FIG. 4). For example, the one or more processors of the cloud system 302 assign a series of alphanumeric characters, such as GMI, to the game multimodal data 500 and 550 to differentiate the game multimodal data 500 and 550 from the virtualized real-world multimodal data 400 and 450.

FIG. 6A is a diagram of an embodiment of modified game multimodal data 600 to illustrate a method for modifying the game multimodal data 500 using one or more of the virtualized real-world multimodal data 400 and 450 (FIG. 4) and for modifying the game multimodal data 550 (FIG. 5) using the one or more of the virtualized real-world multimodal data 400 and 450. The modified game multimodal data 600 includes an MM data portion 602 and the MM data portion 402. Moreover, the modified game multimodal data 600 includes the MM data portions 518, 520, 522, 524, and 526.

The MM data portion 602 includes the MM data portions 516, 404, 406, 408, 410, 419, and 506. The one or more processors of the cloud system 302 determine to modify the game multimodal data 500 based on one or more of the virtualized real-world multimodal data 400 and 450 (FIG. 4) to output the modified game multimodal data 600. For example, the one or more processors of the cloud system 302 determine to overlay the MM data portion 404 representing the real-world building, the MM data portion 406 representing the real-world mountain, and the MM data portion 408 representing the real-world right wall on the MM data portion 502 (FIG. 5) of the virtual fence and the MM data portion 508 (FIG. 5) of the virtual users. Also, in the example, the one or more processors of the cloud system 302 determine to overlay a portion of the MM data portion 506 representing the virtual GT™ race car on top of the MM data portion 408. In the example, the one or more processors of the cloud system 302 overlay on the MM data portions 510 and 512 (FIG. 5), the MM data portion 410 representing the real-world left wall, and overlay on the MM data portion 514 having the virtual lane dividers, the MM data portion 419 representing the real-world race track. Also, in the example, the one or more processors of the cloud system 302 determine not to overlay any MM data portion on the MM data portion 516. Further, in the example, the one or more processors of the cloud system 302 determine to overlay a portion of the MM data portion 518 on top of the MM data portion 602. In the example, the one or more processors of the cloud system 302 determine to add the MM data portion 402 to a left side of the MM data portion 602 to illustrate a real-world view from a virtual side window of the virtual GT™ race car. In the example, the real-world view is provided by the MM data portion 412 representing the real-world trees, the MM data portion 414 representing the real-world house 414, the MM data portion 411 representing the real-world left wall, and the MM data portion 416 representing the real-world left side view mirror. The MM data portion 416 includes the MM data portion 417 representing the real-world tree. In a similar manner, the game multimodal data 550 (FIG. 5) is determined to be modified using one or more of the virtualized real-world multimodal data 400 and 450 by the one or more processors of the cloud system 302 to output modified game multimodal data 650.

Instead of encoding the game multimodal data 500 and 550 (FIG. 5) for outputting the encoded image frames, the one or more processors of the cloud system 302 encode modified game multimodal data, such as the modified game multimodal data 600 and 650, to output encoded modified game multimodal data, and sends the encoded modified game multimodal data via the computer network 304 and the user account 1 to the client device 306 that is operated by the user 1 for display on the client device 306.

Upon receiving the encoded modified game multimodal data, the decoder of the client device 306 decodes the encoded modified game multimodal data to output decoded modified game multimodal data, and provides the decoded modified game multimodal data to the display screen of the display device 301 (FIG. 3) for display of the modified game multimodal data 600 and 650 on the display screen. For example, the processor of the client device 306 overlays on the MM data portion 502 of the virtual fence and the MM data portion 508 of the virtual users with the MM data portion 404 representing the real-world building, the MM data portion 406 representing the real-world mountain, and the MM data portion 408 representing the real-world right wall. Also, in the example, the processor of the client device 306 overlays the portion of the MM data portion 506 representing the other virtual GT™ race car on top of the MM data portion 408. In the example, the processor of the client device 306 overlays on the MM data portions 510 and 512 (FIG. 5), the MM data portion 410 representing the real-world left wall, and overlays on the MM data portion 514 having the virtual lane dividers, the MM data portion 419 representing the real-world race track. Also, in the example, the processor of the client device 306 does not overlay any MM data portion on the MM data portion 516. Further, in the example, the processor of the client device 306 overlays the portion of the MM data portion 518 on top of the MM data portion 602.

In an embodiment, the encoded modified game multimodal data are sent via the computer network 304 and the user account 2 to the client device 310 (FIG. 3) that is operated by the user 2. A decoder of the client device 310 decodes the encoded modified game multimodal data to output the decoded modified game multimodal data and sends the decoded modified game multimodal data to a display screen of the display device 312 (FIG. 3) for display of the modified game multimodal data 600 and 650 on the display screen. When the modified game multimodal data 600 and 650 is displayed on the display screen of the display device 312, the one or more processors of the cloud system generate the game credits and award the game credits to the user account 1.

FIG. 6B-1 is a diagram of an embodiment of modified game multimodal data 652 to illustrate that an MM data portion 653 of the modified game multimodal data 652 is authored and the MM data portion 602 of the modified game multimodal data 652 includes one or more overlays. The one or more processors of the cloud system 302 (FIG. 3) generate the modified game multimodal data 652 at a time T1 during a play of the video game via the user account 1 or 2.

The MM data portion 653 includes an MM data portion 654 representing a virtual booth and an MM data portion 656 representing a virtual lane divider. The MM data portion 653 is not generated by the one or more processors of the cloud system 302 based on real-world multimodal data, such as the real-world multimodal data 100 (FIG. 1). Rather, the one or more processors of the cloud system 302 generate the MM data portion 653 based on the graphical parameters received from an author of graphics of the video game. The graphical parameters are provided to the one or more processors of the cloud system 302 by the author via the input device that is coupled to the one or more processors of the cloud system 302.

The one or more processors of the cloud system 302 determine that there is no virtualized real-world multimodal data portion that can be applied to the MM data portion 653. For example, the one or more processors of the cloud system 302 access the one or more memory devices of the cloud system 302 to determine whether there is a virtualized real-world multimodal data portion generated from real-world multimodal data portion that is captured from the front side window of the GT™ race car. In the example, the real-world multimodal data portion corresponds to the MM data portion 101 (FIG. 1) representing a view from the front windshield of a GT™ race car. To illustrate, the one or more processors of the cloud system 302 determine whether there is the virtualized real-world multimodal data portion generated from a real-world multimodal data portion that is captured from the front side view of the GT™ race car at a time ta, which is the same time at which the MM data portion 101 is captured. In the illustration, upon determining that there is no real-world multimodal data portion captured from the front side view of the GT™ race car at the time ta, the one or more processors of the cloud system 302 determine that there is no virtualized real-world multimodal data portion obtained from the front side window of the GT™ race car. In the illustration, on the other hand, upon determining that the one or more memory devices include the real-world multimodal data portion captured from the front side view of the GT™ race car at the time ta, the one or more processors of the cloud system 302 determine that there is the virtualized real-world multimodal data portion obtained from the front side window of the GT™ race car.

The one or more processors of the cloud system 302 determine to overlay the virtualized real-world multimodal data portion 401 on top of an authored MM data portion, such as the MM data portion 501 (FIG. 5), of the view from the front windshield of the GT™ race car upon determining that there is the virtualized real-world multimodal data portion 401 (FIG. 4) that can be applied to the MM data portion 501 of the game multimodal data 500 (FIG. 5A). For example, the one or more processors of the cloud system 302 access the one or more memory devices of the cloud system 302 to determine whether there is the virtualized real-world multimodal data portion 401 (FIG. 4) generated from the real-world multimodal data portion 101 (FIG. 1) that is the view captured from the front windshield of the GT™ race car towards the race track. To illustrate, the one or more processors of the cloud system 302 determine whether there is the virtualized real-world multimodal data portion 401 generated from the real-world multimodal data portion 101 captured at the time ta. In the illustration, upon determining that there is no virtualized real-world multimodal data portion representing the view captured from the front windshield of the GT™ race car at the time ta, the one or more processors of the cloud system 302 determine that there is no virtualized real-world multimodal data portion for the view. In the illustration, on the other hand, upon determining that the one or more memory devices include the virtualized real-world multimodal data portion 401, the one or more processors of the cloud system 302 determine that there is the virtualized real-world multimodal data portion 401 and determine to overlay the virtualized real-world multimodal data portion 401 for the view from the front windshield of the GT™ race car on the MM data portion 501.

The one or more processors of the cloud system 302 determine to stitch the MM data portion 602 with the MM data portion 653. For example, one or more processors of the cloud system 302 generate an instruction to display the MM data portions 602 and 653 in a single image and to display the MM data portion 653 to the left of the MM data portion 602, and send the instruction to the client device 306 or 310 (FIG. 3). Upon receiving the instruction with the MM data portions 602 and 653, the processor of the client device 306 or 310 displays the MM data portions 602 and 653 as per the instruction.

FIG. 6B-2 is a diagram of an embodiment of a game multimodal data 670 to illustrate that the MM data portion 653 of the game multimodal data 670 is authored and an MM data portion 672 of the game multimodal data 670 is also authored. The one or more processors of the cloud system 302 (FIG. 3) generate the game multimodal data 670 at the time T1 during a play of the video game via the user account 1 or 2.

The MM data portion 672 includes the MM data portion 501. The MM data portion 501 is not generated by the one or more processors of the cloud system 302 based on real-world multimodal data, such as the real-world multimodal data 100 (FIG. 1). Rather, the one or more processors of the cloud system 302 generate the MM data portion 501 based on the graphical parameters received from an author of graphics of the video game. The graphical parameters are provided to the one or more processors of the cloud system 302 by the author via the input device that is coupled to the one or more processors of the cloud system 302.

The one or more processors of the cloud system 302 determine that there is no virtualized real-world multimodal data portion that can be applied to, such as that can be overlaid on, the MM data portion 501. For example, the one or more processors of the cloud system 302 access the one or more memory devices of the cloud system 302 to determine whether there is a virtualized real-world multimodal data portion generated from a real-world multimodal data portion that is captured from the front windshield window of the GT™ race car at the time ta. In the illustration, the one or more processors determine that there is no virtualized real-world multimodal data portion generated from a real-world multimodal data portion representing a real-world fence or a real-world wall or a real-world GT™ race car or a real-world barrier or real-world booths or a real-world lane divider or a combination thereof. In the illustration, the real-world fence corresponds to the virtual fence of the MM data portion 502 (FIG. 5), the real-world wall corresponds to the virtual wall of the MM data portion 504 (FIG. 5), the real-world GT™ race car corresponds to the virtual GT™ race car of the MM data portion 506 (FIG. 5), the real-world barrier corresponds to the real-world barrier of the MM data portion 512 (FIG. 5), the real-world booths correspond to the virtual booths of the MM data portion 510 (FIG. 5), and the real-world lane divider corresponds to the virtual lane divider of the MM data portion 514 (FIG. 5). In the illustration, upon determining that there is no real-world multimodal data portion captured from the front windshield of the GT™ race car at the time ta, the one or more processors of the cloud system 302 determine that there is no virtualized real-world multimodal data portion obtained from the front windshield of the GT™ race car. In the illustration, on the other hand, upon determining that the one or more memory devices include the real-world multimodal data portion captured from the front windshield of the GT™ race car at the time ta, the one or more processors of the cloud system 302 determine that there is the virtualized real-world multimodal data portion obtained from the front windshield of the GT™ race car.

The one or more processors of the cloud system 302 determine to not overlay the virtualized real-world multimodal data portion on top of the MM data portion 672 of the view from the front windshield of the GT™ race car upon determining that there is no virtualized real-world multimodal data portion that can be applied to the MM data portion 672. The one or more processors of the cloud system 302 send the game multimodal data 670 via the computer network 304 to the client device 306 or 310 (FIG. 3) for display of the game multimodal data 670 on the client device.

FIG. 6B-3 is a diagram of an embodiment of modified game multimodal data 680 to illustrate that the MM data portion 402 of the modified game multimodal data 680 includes one or more overlays and the MM data portion 602 of the modified game multimodal data 652 includes one or more overlays. The one or more processors of the cloud system 302 (FIG. 3) generate the modified game multimodal data 680 at the time T1 during a play of the video game via the user account 1 or 2.

The one or more processors of the cloud system 302 determine to overlay the virtualized real-world multimodal data portion 402 on top of the authored MM data portion 653 providing a view from the virtual front side window of the virtual GT™ race car upon determining that there is the virtualized real-world multimodal data portion 402 that can be applied to the authored MM data portion 653 (FIG. 6B-2) of the video game. For example, the one or more processors of the cloud system 302 access the one or more memory devices of the cloud system 302 to determine whether there is the virtualized real-world multimodal data portion 402 generated from the real-world multimodal data portion 102 (FIG. 1) that is a view captured from the front side window of the GT™ race car. To illustrate, the one or more processors of the cloud system 302 determine whether there is the virtualized real-world multimodal data portion 402 generated from the real-world multimodal data portion 102 captured at the time ta. In the illustration, upon determining that there is no real-world multimodal data portion that provides the view captured from the front side window of the GT™ race car at the time ta, the one or more processors of the cloud system 302 determine that there is no virtualized real-world multimodal data portion for the view. In the illustration, on the other hand, upon determining that the one or more memory devices include the virtualized real-world multimodal data portion 402, the one or more processors of the cloud system 302 determine that there is the virtualized real-world multimodal data portion 402 and determine to overlay the virtualized real-world multimodal data portion 402 for the view from the front side window of the GT™ race car on the MM data portion 653, which is authored.

The one or more processors of the cloud system 302 determine to stitch the MM data portion 602 with the MM data portion 402. For example, one or more processors of the cloud system 302 generate an instruction to display the MM data portions 602 and 402 in a single image and to display the MM data portion 402 to the left of the MM data portion 602, and send the instruction to the client device 306 or 310 (FIG. 3). Upon receiving the instruction with the MM data portions 602 and 402, the processor of the client device 306 or 310 displays the MM data portions 602 and 402 on the display device of the client device 306 or 310 as per the instruction.

Figure 7:
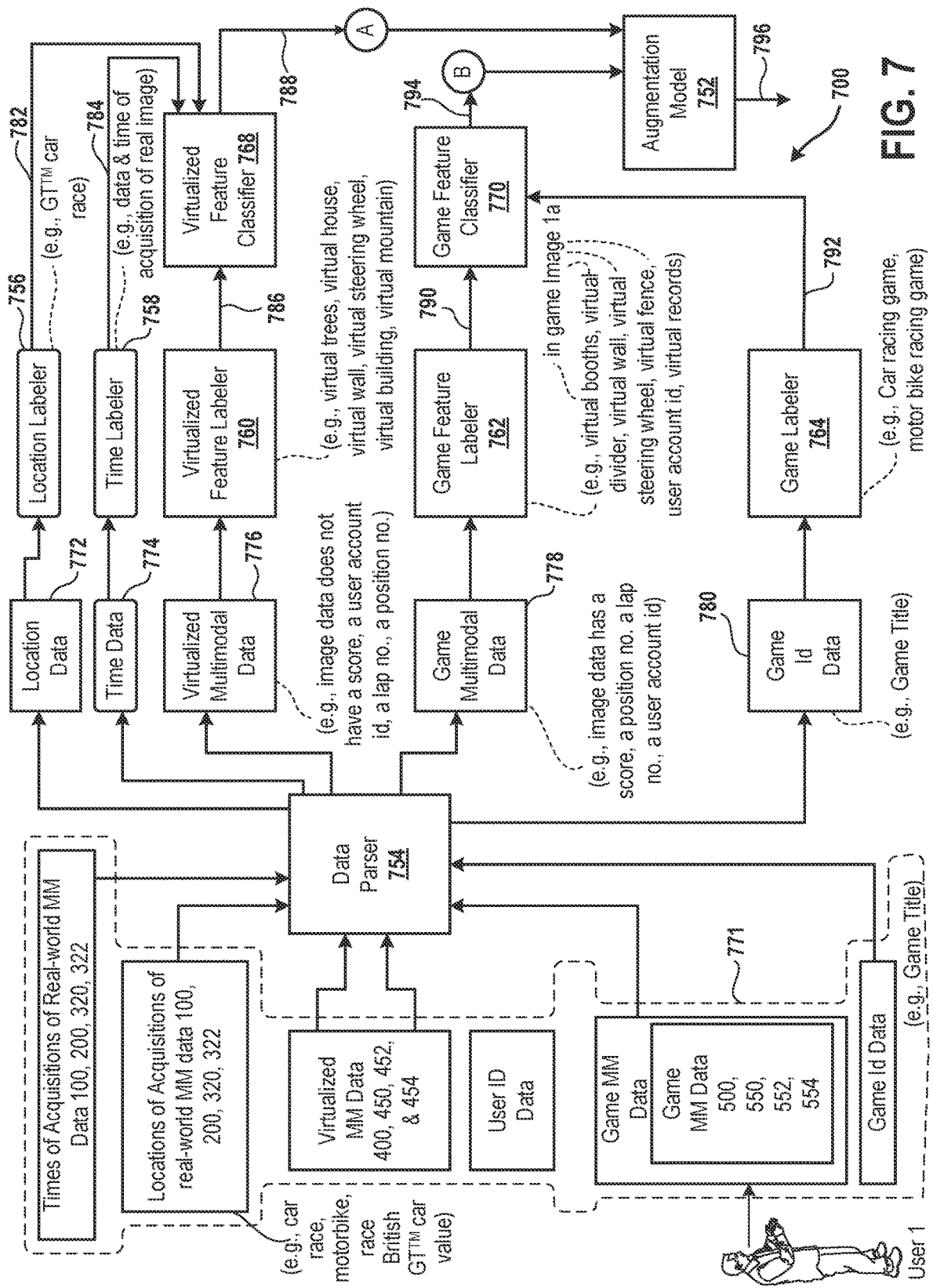
FIG. 7 is a diagram of an embodiment of a system to illustrate a method for training an augmentation model to determine whether to replace an MM data portion representing a virtual object with an MM data portion representing a real-world object.

FIG. 7 is a diagram of an embodiment of a system 700 to illustrate a method for training an augmentation model 752 to determine whether to replace an MM data portion in a game multimodal data representing a virtual object with an MM data portion, from a virtualized real-world multimodal data representing real-world objects. The system 700 includes multiple components, such as a data parser 754, a location labeler 756, a time labeler 758, a virtualized feature labeler 760, a game feature labeler 762, a game labeler 764, a virtualized feature classifier 768, a game feature classifier 770, and the augmentation model 752.

As an example, the components 752 through 770 are implemented within the cloud system 302. As another example, the components 752 through 770 are implemented within a client device, described herein. As yet another example, one or more of the components 752 through 770 are implemented within the cloud system 302 and remaining ones of the components 752 through 770 are implemented within the client device.

As an example, each of the components 752 through 770 is a hardware circuit, such as a processor or an ASIC or a PLD. As another example, each of the components 752 through 770 is a computer-software program that is executed by the one or more processors of the cloud system 302 (FIG. 3). As yet another example, each of the components 752 through 770 is a combination of the hardware circuit and a computer-software program.

The data parser 754 is coupled to the labelers 756, 760, 762, and 764, and to the one or more processors of the cloud system 302. The labelers 756, 758, and 769 are coupled to the virtualized feature classifier 768. Moreover, the labelers 762 and 764 are coupled to the game feature classifier 770. The classifiers 768 and 770 are coupled to the augmentation model 752.

The data parser 754 receives data 771 from the one or more processors of the cloud system 302 (FIG. 3). The data 771 received from the one or more processors of the cloud system 302 includes location data 772, time data 774, virtualized multimodal data 776, game multimodal data 778, and game ID data 780.

The data parser 754 identifies the location data 772, the time data 774, the virtualized multimodal data 776, the game multimodal data 778, and the game ID data 780 from the data 771. For example, the data parser 754 determines that the location data 772 includes a location at which the real-world multimodal data 100 and 200 and a location at which the real-world multimodal data 320 and 322 are obtained to identify the location data 772 from the data 771. To illustrate, the location data 722 includes the GT™ car race at a geographic region, such as Macau. In the illustration, the geographic region and an identification of the GT™ car race are examples of the location data 772. Also, in the illustration, each of the one or more digital cameras is embedded within a respective device that includes a global positioning system (GPS) tracking device, such as a GPS locator. In the illustration, the GPS tracking device is a part of a GPS system. In the illustration, the GPS system determines the location of the GT™ race car as being in the GT™ car race at the geographic region and provides the location to the one or more processors of the cloud system 302. In the illustration, the GPS system is coupled to the one or more processors of the cloud system 302. To further illustrate, the data parser 754 determines that the location data 772 includes a longitude and latitude to distinguish the location data 772 from the data 771.

Moreover, as another example, the data parser 754 determines that the time data 774 includes dates and times, such as the time ta, at which the real-world multimodal data 100 and 200 are captured by the one or more digital cameras and dates and times at which the real-world multimodal data 320 and 322 are captured by the one or more digital cameras to identify the time data 774 from the data 771. As an illustration, the data parser 754 determines that the time data 774 includes a month, a day, and a year followed by hours, seconds, ante meridiem (AM), and post meridiem (PM) to distinguish the time data 774 from the data 771.

Also, as yet another example, the data parser 754 determines that the virtualized multimodal data 776 includes the virtualized images 400, 450, 452, and 454 (FIG. 4) to identify the virtualized multimodal data 776 from the data 771. To illustrate, the data parser 754 identifies the virtualized image identifiers from the data 771 to identify the virtualized multimodal data 776 from the data 771. As another illustration, the data parser 754 determines that each of the virtualized images 400, 450, 452, and 454 does not include a respective game record, such as a virtual speed record, or a position of the virtual user in the virtual GT™ race car, or the lap that is travelled by the virtual GT™ race car, or a user account identifier, to identify the virtualized multimodal data 776 from the data 771. Examples of the user account identifier include the user account 1 and the user account 2.

As another example, the data parser 754 determines that the game multimodal data 778 includes the game multimodal data 500, 550, 552, and 554 to identify the game multimodal data 778 from the data 771. To illustrate, the data parser 754 identifies the game multimodal data identifiers from the data 771 to identify the game multimodal data 778 from the data 771. As another illustration, the data parser 754 determines that each of the game multimodal data 500, 550, 552, and 554 includes the respective game record, examples of which are provided above, to identify the game multimodal data 778 from the data 771.

As yet another example, the data parser 754 determines that the game ID data 780 includes an identifier, such as a title, of the video game to identify the game ID data 780 from the data 771. For example, the data parser 754 identifies that a series of alphanumeric characters are followed by a trademark identifier, such as™, to distinguish the game ID data 780 from the data 771.

The location labeler 756 receives the location data 772 from the data parser 754 and labels the location data 772 to output labeled location data 782. For example, the location labeler 756 distinguishes a first location within the location data 772 from a second location within the location data 772, assigns a first location label to the first location, and assigns a second location label to the second location. To illustrate, the location labeler 756 distinguishes the GT™ car race from a motor bike race and distinguishes Macau from another geographic location, such as Zurich, at which the motor bike race takes place. In the illustration, the GT™ car race and Macau are portions of the first location and the motor bike race and Zurich are portions of the second location. In the example, the first and second location labels are examples of the labeled location data 782.

Also, the time labeler 758 receives the time data 779 from the data parser 754 and labels the time data 779 to output labeled time data 784. As an example, the time labeler 758 distinguishes a first time and a first date of capture of the real-world multimodal data 100 by the one or more digital cameras from a second time and a second date of capture of the real-world multimodal data 200 by the one or more digital cameras, a third time and a third date of capture of the real-world multimodal data 320 by the one or more digital cameras, and a fourth time and a fourth date of capture of the real-world multimodal data 322 by the one or more digital cameras. In the example, the second time occurs after the first time and the fourth time occurs after the third time. Further, in the example, the time labeler 758 assigns a first time and date label to the first time and the first date, a second time and date label to the second time and the second date, a third time and date label to the third time and the third date, and a fourth time and date label to the fourth time and the fourth date. In the example, the first through fourth time and date labels are examples of the labeled time data 784.

Moreover, the virtualized feature labeler 760 receives the virtualized multimodal data 776 from the data parser 754 and identifies each MM data portion representing one or more real-world objects in the virtualized multimodal data 776 to output labeled virtualized image feature data 786. For example, the virtualized feature labeler 760 receives the virtualized image 400, and identifies that the MM data portion 412 (FIG. 4) represents the real-world trees, the MM data portion 414 (FIG. 4) represents the real-world house, the MM data portion 417 represents the real-world tree, the MM data portion 416 (FIG. 4) represents the real-world left side rearview mirror of the GT™ race car, and so on, until it identifies all the MM data portions of the virtualized image 400 (FIG. 4). To illustrate, the virtualized image features labeler 760 compares a first set of the graphical parameters, such as a shape or a size or a combination thereof, of a real-world tree of the MM data portion 412 with a second set of pre-determined graphical parameters of a tree or with a third set of graphical parameters of a tree from virtualized multimodal data received prior to the reception of the virtualized multimodal data 776 and determines whether there is similarity, such as a match, between the first and second or the first and third sets. In the illustration, upon determining that the similarity exists, the virtualized image features labeler 760 determines that the MM data portion 412 represents the real-world trees. On the other hand, in the illustration, in response to determining that the similarity does not exist, the virtualized image features labeler 760 determines that the MM data portion 412 does not represent the real-world trees. As another illustration, to determine that the similarity exits, the one or more processors determine whether one of the graphical parameters, such as a shape, of the first set is within a pre-determined range from one of the pre-determined graphical parameters of the second set or from one of the graphical parameters of the third set. In the illustration, upon determining that the first set is within the pre-determined range from one of the pre-determined graphical parameters of the second set or from one of the graphical parameters of the third set, the one or more processors determine that the similarity exists. In the illustration, on the other hand, upon determining that the first set is not within the pre-determined range from one of the pre-determined graphical parameters of the second set or from one of the graphical parameters of the third set, the one or more processors determine that the similarity does not exist.

In the example, the virtualized feature labeler 760 assigns a first image feature label to the MM data portion 412 representing the real-world trees, a second image feature label to the MM data portion 414 representing the real-world house, a third image feature label to the MM data portion 417 representing the real-world tree, a fourth image feature label to the MM data portion 416 (FIG. 4) representing the real-world left side rearview mirror of the GT™ race car, a fifth image feature label to the MM data portion 402 (FIG. 4), a sixth image feature label to the MM data portion 401 (FIG. 4), a seventh image feature label to a virtualized MM data portion generated from a real-world multimodal data portion captured at the motor bike race, and an eighth image feature label to another MM data portion of the virtualized image 450 (FIG. 4). In the example, the first through eighth image feature labels are examples of the labeled virtualized image feature data 786.

The virtualized feature classifier 768 receives the labeled location data 782, the labeled time data 784, and the labeled virtualized image feature data 786 and classifies the labeled virtualized image feature data 786 according to the labeled location data or the labeled time data 784 or a combination thereof to output classified virtualized image feature data 788. For example, the virtualized feature classifier 768 determines that the fifth image feature label identifies the MM data portion 402 that is generated from the MM data portion 102 (FIG. 1) captured at the GT™ car race in Macau on Apr. 12, 2006 at 12 PM. In the example, the location of the GT™ car race in Macau on Apr. 12, 2006 at 12 PM is provided by the first location label and the first time and date label. In the example, the virtualized feature classifier 768 assigns a first virtualized image feature classification to a correspondence, such as a one-to-one relationship, or a unique relationship, between the MM data portion 402 and the location of the GT™ car race in Macau on Apr. 12, 2006 at 12 PM.

As another example, the virtualized feature classifier 768 determines that the sixth image feature label identifies the MM data portion 401 that is generated from the MM data portion 101 (FIG. 1) captured at the GT™ car race in Macau on Apr. 12, 2006 at 12 PM. In the example, the virtualized feature classifier 768 assigns a second virtualized image feature classification to a correspondence, such as a one-to-one relationship, or a unique relationship, between the MM data portion 401 and the location of the GT™ car race in Macau on Apr. 12, 2006 at 12 PM.

As yet another example, the virtualized feature classifier 768 determines that the first image feature label identifies the MM data portion 412 that is generated from the MM data portion 112 (FIG. 1) captured at the GT™ car race in Macau on Apr. 12, 2006 at 12 PM. In the example, the virtualized feature classifier 768 assigns a third virtualized image feature classification to a correspondence, such as a one-to-one relationship, or a unique relationship, between the MM data portion 412 and the location of the GT™ car race in Macau on Apr. 12, 2006 at 12 PM.

Further, as another example, the virtualized feature classifier 768 determines that the seventh image feature label identifies the virtualized MM data portion generated from the real-world multimodal data portion captured at the motor bike race in Zurich at 10 AM, and assigns a fourth virtualized image feature classification to a correspondence, such as a one-to-one relationship, or a unique relationship, between the virtualized MM data portion generated from the real-world multimodal data portion captured at the motor bike race and the location of the motor bike race in Zurich at 10 AM.

Also, as another example, the virtualized feature classifier 768 determines that an image feature label identifies the virtualized MM data portion 419 (FIG. 4) generated from a real-world multimodal data portion captured at the GT™ car race in Macau on Apr. 12, 2006 at 12 PM, and assigns a fifth virtualized image feature classification to a correspondence, such as a one-to-one relationship, or a unique relationship, between the virtualized MM data portion 419 and the location of the GT™ car race in Macau at 12 PM. In the preceding four examples, the first through fifth virtualized image feature classification are examples of the classified virtualized image feature data 788.

Also, the game feature labeler 762 receives the game multimodal data 778 from the data parser 754 and identifies each virtual object in the game multimodal data 778 to output labeled game multimodal feature data 790. For example, the virtual game feature labeler 762 receives the game multimodal data 500 (FIG. 5), and identifies that the MM data portion 501 represents the virtual view from the virtual front windshield of the virtual GT™ race car, the MM data portion 502 (FIG. 5) represents the virtual fence, the MM data portion 522 (FIG. 5) represents the position of the virtual user in the virtual GT™ race car among positions of multiple virtual users in the virtual GT™ race car, and so on, until it identifies all the MM data portions of the game multimodal data 500. To illustrate, the game feature labeler 762 requests identifications of the virtual objects of the game multimodal data 778 from the one or more processors of the cloud system 302 and receives the identifications in response to the request. In the example, the game feature labeler 762 receives the game multimodal data 778, and identifies that an MM data portion of the game multimodal data 552 of the motor bike racing video game represents a virtual view from a front of a virtual motor bike competing in the motor bike racing video game, and so on, until it identifies all the MM data portions of the game multimodal data 552. In the example, the game feature labeler 762 assigns a first game multimodal feature label to the MM data portion 501, a second game multimodal feature label to the MM data portion 502, a third game multimodal feature label to the MM data portion 522, and a fourth image feature label to the MM data portion of the game multimodal data 552. Moreover, in the example, the game feature labeler 762 assigns a fifth image feature label to a lack of a side view MM data portion of the game multimodal data 500. In the example, the game feature labeler 762 determines that the side view MM data portion is lacking from the game multimodal data 500 upon identifying that the MM data portion 501 represents the virtual view from the virtual front windshield of the virtual GT™ race car. In the example, the first through fifth game multimodal feature labels are examples of the labeled game multimodal feature data 790.

The game labeler 764 receives the game ID data 780 from the data parser 754 and identifies each game title in the game ID data 780 to output labeled game ID data 792. For example, the game labeler 764 identifies, from the game ID data 780, that a game title of the GT™ car racing game is different from a game title of the motor bike racing video game, which is another example of the video game. In the example, the game labeler 764 assigns a first game ID label to the GT™ car racing game and a second game ID label to the motor bike racing video game. In the example, the game labeler 764 assigns the first game ID label to the GT™ car racing game and a second game ID label to the motor bike racing video game. In the preceding two examples, the first and second game ID labels are examples of the labeled game ID data 792.

The game feature classifier 770 receives the labeled game multimodal feature data 790 from the game feature labeler 762 and the labeled game ID data 792 from the game labeler 764 and classifies the labeled game multimodal feature data 790 according to the labeled game ID data 792 to output classified game multimodal feature data 794. For example, the game feature classifier 770 determines that the first game multimodal feature label and the first game ID label together identify the MM data portion 501 of the GT™ car racing game. In the example, the game feature classifier 770 assigns a first game multimodal feature classification to a correspondence, such as a one-to-one relationship, or a unique relationship, between the MM data portion 501 and the GT™ car racing game. As another example, the game feature classifier 770 assigns a second game multimodal feature classification to a correspondence, such as a one-to-one relationship, or a unique relationship, between the lack of the side view MM data portion of the game multimodal data 500 and the GT™ car racing game.

As another example, the game feature classifier 770 determines that the fourth game multimodal feature label and the second game ID label together identify the MM data portion of the motor bike racing video game. In the example, the game feature classifier 770 assigns a third game multimodal feature classification to a correspondence between the MM data portion of the game multimodal data 552 of the motor bike racing video game and the motor bike racing video game. As yet another example, the game feature classifier 770 determines that a game multimodal feature label that identifies the game multimodal data portion 514 (FIG. 5) and the first game ID label together identify the game multimodal data portion 514 of the GT™ car racing video game. In the example, the game feature classifier 770 assigns a fourth game multimodal feature classification to a correspondence between the game multimodal data portion 514 and the GT™ car racing video game. In the preceding three examples, the first through fourth game multimodal feature classifications are examples of the classified game multimodal feature data 794.

The augmentation model 752 is trained based on the classified virtualized image feature data 788 and the classified game multimodal feature data 794 to output a trained response 796, which is an example of a relationship between the classified virtualized image feature data 788 and the classified game multimodal feature data 794. For example, the augmentation model 752 is provided simultaneously with the first virtualized image feature classification determined based on the virtualized MM data portion 402 and the second game multimodal feature classification determined based on the lack of the side view MM data portion of the game multimodal data 500 to indicate to the augmentation model 752 that the lack of the side view MM data portion of the game multimodal data 500 is similar to the virtualized MM data portion 402. To illustrate, at the same time, the virtualized feature classifier 768 sends the first virtualized image feature classification and the game feature classifier 770 sends the second game multimodal feature classification to the augmentation model 752 at the same time to simultaneously provide the augmentation model 752 with the first virtualized image feature classification and the second game multimodal feature classification. Moreover, in the example, the augmentation model 752 is provided simultaneously with the second virtualized image feature classification determined based on the MM data portion 401 and the first game multimodal feature classification determined based on the MM data portion 501 to indicate to the augmentation model 752 that the game multimodal data portion 501 is similar to the virtualized MM data portion 401.

As yet another example, the augmentation model 752 is provided simultaneously with the fourth virtualized image feature classification generated based on the virtualized MM data portion generated from the real-world multimodal data portion captured at the motor bike race and the third game multimodal feature classification generated based on the MM data portion of the game multimodal data 552 of the motor bike racing video game to indicate to the augmentation model 752 that the game multimodal data portion of the game multimodal data 552 is similar to the virtualized MM data portion generated from the real-world multimodal data portion captured at the motor bike race. As another example, the augmentation model 752 is provided simultaneously with the fifth virtualized image feature classification generated based on the virtualized MM data portion 419 (FIG. 4) and the fourth game multimodal feature classification generated based on the game multimodal data portion 514 to indicate to the augmentation model 752 that the game multimodal data portion 514 representing the virtual lane dividers is similar to the virtualized MM data portion 419 representing the virtualized real-world race track. In the example, the virtual lane dividers and the virtualized real-world race track are both race tracks having the same identification. As yet another example, the augmentation model 752 is provided simultaneously with the a virtualized image feature classification generated based on the virtualized MM data portion 408 (FIG. 4) and a game multimodal feature classification generated based on the game multimodal data portion 504 to indicate to the augmentation model 752 that the game multimodal data portion 504 representing the virtual wall is similar to the virtualized MM data portion 408 representing the real-world right wall. In the example, the virtual wall and the real-world right wall are both walls having the same identification.

In a similar manner, the augmentation model 752 is trained with multiple instances of additional virtualized image feature classifications generated based on virtualized MM data portions and additional game multimodal feature classifications generated based on game MM data portions to identify similarities between the game multimodal data portions and the virtualized MM data portions. Upon identifying that a majority of instances from a predetermined number of instances indicate similarities between a game multimodal data portion and a virtualized MM data portion, the augmentation model 752 indicate a high probability that the game multimodal data portion be replaced with the virtualized MM data portion. On the other hand, upon identifying that a minority of instances from the predetermined number of instances indicate similarities between a game multimodal data portion and a virtualized MM data portion, the augmentation model 752 indicate a high probability that the game multimodal data portion not be replaced with the virtualized MM data portion. The high probability that the game multimodal data portion be replaced with the virtualized MM data portion and the high probability that the game multimodal data portion not be replaced with the virtualized MM data portion are examples of the trained response 796.

Upon receiving the trained response 796 indicating the high probability that the game multimodal data portion be replaced with the virtualized MM data portion, the one or more processors of the cloud system 302 augment, such as overlay or cover or obfuscate, data for displaying the game multimodal data portion with data for displaying the virtualized MM data portion to output data for displaying a modified image frame, and sends the data for displaying the modified image frame via the computer network 304 to a client device, such as the client device 306 or 310 (FIG. 3), operated by a user. As an example, the request to play the video game is received by the one or more processors of the cloud system 302, and after the request is received, the augmentation model 752 is trained to generate the trained response 796. In the example, once the augmentation model 752 is trained, the one or more processors of the cloud system 302 determine whether the data for displaying the modified image frame generated based on the training is to be sent to the client device. In the example, upon determining so, the one or more processors of the cloud system 302 send the data for displaying the modified image frame to the client device.

As another example, once the augmentation model 752 is trained to generate the trained response 796, the one or more processors of the cloud system 302 store the data for displaying the virtualized MM data portion and the data for displaying the game multimodal data portion in the one or more memory devices of the cloud system 302. In the example, after the augmentation model 752 is trained, another request to play the video game is received by the one or more processors of the cloud system 302. To illustrate, the other request is received after the augmentation model 752 is trained based on a previous request to play the video game. In the example, after the other request is received, the one or more processors of the cloud system 302 determine whether to augment additional data for displaying the game multimodal data portion with the data for displaying the virtualized MM data portion to output the data for displaying the modified image frame, and send the data for displaying the modified image frame to the client device. To illustrate, after the other request is received, the one or more processors determine based on the input signals received from the client device, one or more game states and generate, based on the one or more game states, the additional data for displaying the game multimodal data portion. In the illustration, the one or more processors compare the additional data for displaying the game multimodal data portion with the data for displaying the game multimodal data portion stored in the one or more memory devices to determine whether there is a similarity, e.g., match in the graphical parameters, between the data and the additional data. In the illustration, upon determining that the similarity exists, the one or more processors access the data for displaying the virtualized MM data portion from the one or more memory devices, and augment the additional data for displaying the game multimodal data portion with the data for displaying the virtualized MM data portion to output the data for displaying the modified image frame. In the illustration, the one or more processors of the cloud system 302 send the data for displaying the modified image frame to the client device.

Upon receiving the data for displaying the modified image frame, the processor of the client device displaying the modified image frame on a display device of the client device. On the other hand, upon receiving the trained response 796 indicating the high probability that the game multimodal data portion not be replaced with the virtualized MM data portion, the one or more processors of the cloud system 302 do not augment data for displaying the game multimodal data portion with data for displaying the virtualized MM data portion to output a game multimodal data frame. Rather, the one or more processors of the cloud system 302 sends the data for displaying the game multimodal data frame, which is authored, via the computer network 304 to the client device. Upon receiving the data for displaying the game multimodal data frame, the processor of the client device displays the game multimodal data frame on the display device of the client device.

It should be noted that the one or more processors of the cloud system 302 generate and provide a reward, such as game credits, to the user account 1 when data for displaying one or more of the modified game multimodal data 600 and 650 is sent from the one or more processors of the cloud system 302 via the user account 1 and the cloud system 302 to the client device 310 (FIG. 3) operated by the user 2. For example, upon determining that the user 2 has requested via the user account 2 that one or more game multimodal data portions of one or more of the game multimodal data 552 and 554 be replaced with one or more of the virtualized MM data portions generated from one or more real-world multimodal data portions captured by the user 1, the one or more processors access the user account 1 and provide the reward to the user account 1.

Figure 8:
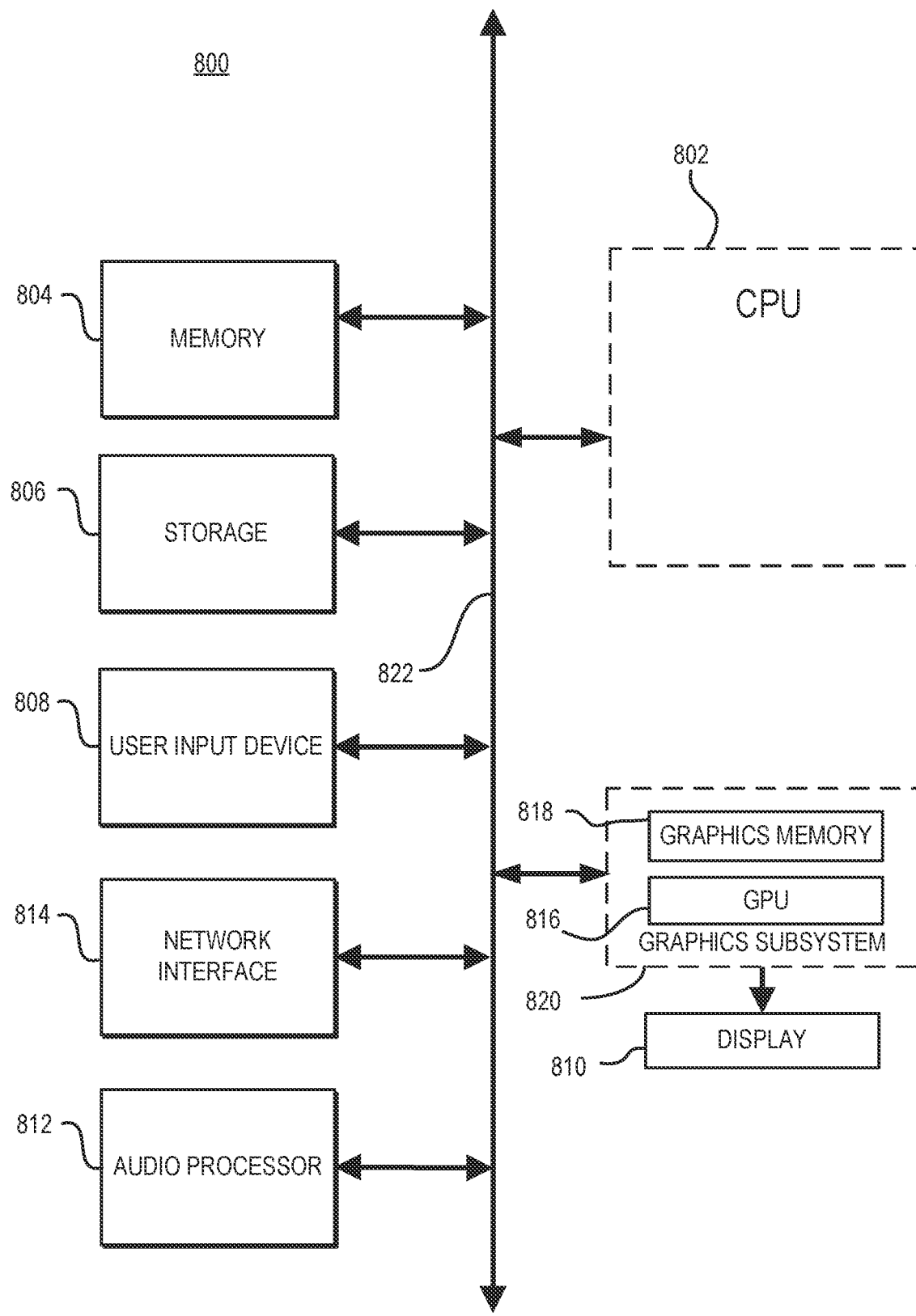
FIG. 8 illustrates components of an example device that can be used to perform aspects of various embodiments described in the present disclosure.

FIG. 8 illustrates components of an example device 800 that can be used to perform aspects of the various embodiments of the present disclosure. This block diagram illustrates the device 800 that can incorporate or can be a personal computer, video game console, personal digital assistant, a server or other digital device, suitable for practicing an embodiment of the disclosure. The device 800 includes a CPU 802 for running software applications and optionally an operating system. The CPU 802 includes one or more homogeneous or heterogeneous processing cores. For example, the CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 800 can be a localized to a player playing a game segment (e.g., game console), or remote from the player (e.g., back-end server processor), or one of many servers using virtualization in a game cloud system 302 for remote streaming of gameplay to clients.

A memory 804 stores applications and data for use by the CPU 802. A storage 806 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 808 communicate user inputs from one or more users to the device 800. Examples of the user input devices 808 include keyboards, mouse, joysticks, touch pads, touch screens, still or video recorders/cameras, tracking devices for recognizing gestures, and/or microphones. A network interface 814 allows the device 800 to communicate with other computer systems via an electronic communications network, and may include wired or wireless communication over local area networks and wide area networks, such as the internet. An audio processor 812 is adapted to generate analog or digital audio output from instructions and/or data provided by the CPU 802, the memory 804, and/or data storage 806. The components of device 800, including the CPU 802, the memory 804, the data storage 806, the user input devices 808, the network interface 814, and an audio processor 812 are connected via a data bus 822.

A graphics subsystem 820 is further connected with the data bus 822 and the components of the device 800. The graphics subsystem 820 includes a graphics processing unit (GPU) 816 and a graphics memory 818. The graphics memory 818 includes a display memory (e.g., a frame buffer) used for storing pixel data for each pixel of an output image. The graphics memory 818 can be integrated in the same device as the GPU 816, connected as a separate device with the GPU 816, and/or implemented within the memory 804. Pixel data can be provided to the graphics memory 818 directly from the CPU 802. Alternatively, the CPU 802 provides the GPU 816 with data and/or instructions defining the desired output images, from which the GPU 816 generates the pixel data of one or more output images. The data and/or instructions defining the desired output images can be stored in the memory 804 and/or the graphics memory 818. In an embodiment, the GPU 816 includes three-dimensional (3D) rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from the graphics memory 818 to be displayed on the display device 810. The display device 810 can be any device capable of displaying visual information in response to a signal from the device 800, including a cathode ray tube (CRT) display, a liquid crystal display (LCD), a plasma display, and an organic light emitting diode (OLED) display. The device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network 304 diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system 302 as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memory (CD-ROMs), CD-recordable (CD-Rs), CD-rewritable (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for integration of real-world content into a game, comprising:
   receiving a request to play the game;
   accessing overlay multimodal data generated from a portion of real-world multimodal data received as user generated content (RGC), wherein the overlay multimodal data is configured to relate to, based on an identification of the game, authored multimodal data generated for the game; and
   replacing or modifying the authored multimodal data using the overlay multimodal data.

2. The method of claim 1, wherein the overlay multimodal data is generated by virtualizing the portion of the real-world multimodal data, wherein said virtualizing the portion of the real-world multimodal data includes:
   modifying a resolution of the portion of the real-world multimodal data; or
   removing a virtual object from the portion of the real-world multimodal data; or
   obfuscating a real-world object in the real-world multimodal data; or
   a combination thereof.

3. The method of claim 1, wherein the real-world multimodal data is captured using a camera in a real-world.

4. The method of claim 1, wherein the overlay multimodal data relates to the authored multimodal data based on an identification of a virtual object of the authored multimodal data and an identification of an object in the real-world multimodal data.

5. The method of claim 4, wherein the identification of the virtual object of the authored multimodal data is the same as the identification of the object on the real-world multimodal data.

6. The method of claim 1, wherein said replacing the authored multimodal data includes overlaying the authored multimodal data with the overlay multimodal data.

7. The method of claim 6, wherein said overlaying the authored multimodal data includes covering the authored multimodal data with the overlay multimodal data.

8. The method of claim 1, wherein the overlay multimodal data is generated and related to the authored multimodal data before the request to play the game is received.

9. The method of claim 1, further comprising sending one or more image frames having the overlay multimodal data instead of the authored multimodal data to a client device.

10. A server for integration of real-world content into a game, comprising:
a memory device; and
a processor coupled to the memory device, wherein the processor is configured to:
receive a request to play the game;
access, from the memory device, overlay multimodal data generated from a portion of real-world multimodal data received as user generated content (RGC), wherein the overlay multimodal data is configured to relate to, based on an identification of the game, authored multimodal data generated for the game; and
replace or modify the authored multimodal data using the overlay multimodal data.

11. The server of claim 10, wherein the overlay multimodal data is generated by the processor by virtualizing the portion of the real-world multimodal data, wherein to virtualize the portion of the real-world multimodal data, the processor is configured to:
modify a resolution of the portion of the real-world multimodal data; or
remove a virtual object from the portion of the real-world multimodal data; or
obfuscate a real-world object in the real-world multimodal data; or
a combination thereof.

12. The server of claim 10, wherein the real-world multimodal data is captured using a camera in a real-world.

13. The server of claim 12, wherein the processor is configured to relate the overlay multimodal data to the authored multimodal data based on an identification of a virtual object of the authored multimodal data and an identification of an object in the real-world multimodal data.

14. The server of claim 13, wherein the identification of the virtual object of the authored multimodal data is the same as the identification of the object on the real-world multimodal data.

15. The server of claim 10, wherein to replace the authored multimodal data, the processor is configured to overlay the authored multimodal data with the overlay multimodal data, wherein to overlay the authored multimodal data, the processor is configured to cover the authored multimodal data with the overlay multimodal data.

16. A non-transitory computer-readable medium containing program instructions for integration of real-world content into a game, wherein execution of the program instructions by one or more processors of a computer system causes the one or more processors to carry out operations of:
receiving a request to play the game;
accessing overlay multimodal data generated from a portion of real-world multimodal data received as user generated content (RGC), wherein the overlay multimodal data is configured to relate to, based on an identification of the game, authored multimodal data generated for the game; and
replacing or modifying the authored multimodal data using the overlay multimodal data.

17. The non-transitory computer-readable medium of claim 16, wherein the overlay multimodal data is generated by virtualizing the portion of the real-world multimodal data, wherein said virtualizing the portion of the real-world multimodal data includes:
modifying a resolution of the portion of the real-world multimodal data; or
removing a virtual object from the portion of the real-world multimodal data; or
obfuscating a real-world object in the real-world multimodal data; or
a combination thereof.

18. The non-transitory computer-readable medium of claim 16, wherein the real-world multimodal data is captured using a camera in a real-world.

* * * * *